US012697889B2

(12) United States Patent
Kim et al.

(10) Patent No.: US 12,697,889 B2
(45) Date of Patent: Aug. 4, 2026

(54) CHARGING SYSTEM FOR PERSONAL MOBILITY DEVICES

(71) Applicant: LG ELECTRONICS INC., Seoul (KR)

(72) Inventors: Sungpil Kim, Seoul (KR); Byungsang Jung, Seoul (KR); Hyunghoon Park, Seoul (KR); Wan-Keun Park, Seoul (KR); Sang-Hak Lee, Seoul (KR); Seung Jin Jang, Seoul (KR); Dongik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 748 days.

(21) Appl. No.: 18/026,072

(22) PCT Filed: Feb. 4, 2021

(86) PCT No.: PCT/KR2021/001473
§ 371 (c)(1),
(2) Date: Mar. 13, 2023

(87) PCT Pub. No.: WO2022/055053
PCT Pub. Date: Mar. 17, 2022

(65) Prior Publication Data
US 2023/0365005 A1 Nov. 16, 2023

(30) Foreign Application Priority Data

Sep. 14, 2020 (KR) ........................ 10-2020-0117449

(51) Int. Cl.
*H01M 10/46* (2006.01)
*B60K 35/10* (2024.01)
(Continued)

(52) U.S. Cl.
CPC ............ *B60L 53/122* (2019.02); *B60K 35/10* (2024.01); *B60K 35/22* (2024.01); *B60K 35/50* (2024.01);
(Continued)

(58) Field of Classification Search
CPC ...... H02J 7/0044; H02J 7/0042; H02J 50/005; H02J 50/90; H02J 50/10; B60L 53/12;
(Continued)

(56) References Cited

U.S. PATENT DOCUMENTS 9,068,374 B2 * 6/2015 Jayadevappa ............ B62H 3/00
2008/0040479 A1 * 2/2008 Bridge .................. H04W 4/023
709/224
(Continued)

FOREIGN PATENT DOCUMENTS

CN 114074566 B * 9/2024 .............. B60L 53/38
ES 2371402 B1 * 11/2012 ............ H02J 7/0042
(Continued)

OTHER PUBLICATIONS

Machine translate of KR20200027335A (Mar. 12, 2020). (Year: 2020).*
(Continued)

*Primary Examiner* — Edward Tso
(74) *Attorney, Agent, or Firm* — LEE, HONG, DEGERMAN, KANG & WAIMEY

(57) ABSTRACT

The present invention relates to a charging system for personal mobility devices and, more particularly, may includes: support units provided with slots into which wheels of personal mobility devices are mounted; first charging units which are installed toward the personal mobility devices and generate magnetic fields for wireless charging; and second charging units which are mounted onto the personal mobility devices, and which covert the mag-
(Continued)

netic fields, received via the first charging units, into electric power to charge the batteries provided in the personal mobility devices.

20 Claims, 6 Drawing Sheets

(51) Int. Cl.

| | |
|---|---|
| *B60K 35/22* | (2024.01) |
| *B60K 35/50* | (2024.01) |
| *B60K 35/60* | (2024.01) |
| *B60K 35/81* | (2024.01) |
| *B60L 53/122* | (2019.01) |
| *B60L 53/68* | (2019.01) |
| *B62H 3/08* | (2006.01) |
| *H02J 7/70* | (2026.01) |
| *H02J 50/10* | (2016.01) |
| *H02J 50/90* | (2016.01) |

(52) U.S. Cl.
CPC .............. *B60K 35/60* (2024.01); *B60K 35/81* (2024.01); *B60L 53/68* (2019.02); *B62H 3/08* (2013.01); *H02J 7/70* (2026.01); *H02J 50/10* (2016.02); *H02J 50/90* (2016.02); *B60L 2200/12* (2013.01); *B60L 2200/24* (2013.01); *B60L 2250/16* (2013.01)

(58) Field of Classification Search
CPC .......... B60L 53/36; B60L 58/12; B60L 53/67; B60L 53/122; B60L 2200/12; B60L 2200/24; B60L 2200/16; B60K 35/22; B60K 35/81; B60K 35/10; B60K 35/60; B60K 35/50

USPC ....... 320/104, 107, 108, 109, 114, 132, 149, 320/DIG. 18

See application file for complete search history.

(56) References Cited

U.S. PATENT DOCUMENTS

| | | | | |
|---|---|---|---|---|
| 2011/0148346 A1* | 6/2011 | Gagosz | ................... | B60L 50/20 |
| | | | | 320/135 |
| 2017/0088001 A1* | 3/2017 | Haas | ....................... | B60L 53/64 |
| 2022/0242256 A1* | 8/2022 | Cho | ...................... | H02J 50/402 |

FOREIGN PATENT DOCUMENTS

| | | | | | |
|---|---|---|---|---|---|
| FR | 2828665 A1 | * | 2/2003 | .............. | B60L 53/34 |
| JP | 3907166 B2 | * | 4/2007 | .............. | B60L 53/16 |
| JP | 6309162 | | 4/2018 | | |
| KR | 20-2010-0001311 | | 2/2010 | | |
| KR | 20110007555 A | * | 1/2011 | .............. | H02J 50/10 |
| KR | 10-2016-0054342 | | 5/2016 | | |
| KR | 10-1955216 | | 3/2019 | | |
| KR | 10-2020-0026493 | | 3/2020 | | |
| KR | 10-2020-0027335 | | 3/2020 | | |
| KR | 10-2020-0085964 | | 7/2020 | | |
| WO | 2018084358 | | 5/2018 | | |

OTHER PUBLICATIONS

PCT International Application No. PCT/KR2021/001473, International Search Report dated Jun. 10, 2021, 5 pages.
Korean Intellectual Property Office Application No. 10-2020-0117449, Office Action dated Apr. 14, 2025, 4 pages.

* cited by examiner

CHARGING SYSTEM FOR PERSONAL MOBILITY DEVICES

CROSS-REFERENCE TO RELATED APPLICATIONS

This application is the National Stage filing under 35 U.S.C. 371 of International Application No. PCT/KR2021/001473, filed on Feb. 4, 2021, which claims the benefit of earlier filing date and right of priority to Korean Application No. 10-2020-0117449, filed on Sep. 14, 2020, the contents of which are all incorporated by reference herein in their entirety.

TECHNICAL FIELD

The present disclosure relates to a charging system for personal mobility devices that may keep and charge the personal mobility devices.

BACKGROUND ART

In general, a personal mobility device is means of transportation for one person powered by electricity, and may include an electric wheel, an electric kickboard, an electric bicycle and a micro-electric vehicle.

The electric kickboard commonly used as the personal mobility device may include a body having a shape of a stake board, a support bar extending upward from the body, a handle extending to both sides o the support bar, and a wheel rotatably coupled to the body and the support bar.

Recently, such the personal mobility device may include a motor for supplying a rotational power and a battery for supplying power to the motor.

Since the conventional personal mobility device is left on the street after being used, there is a problem in that the left personal mobility device could interfere with the movement of pedestrians and vehicles. In addition, since the personal mobility device could not be charged immediately after use, inconvenience in use has been increased. Due to that structure, there is a need for improving the conventional structure.

The background art of the present disclosure is disclosed in KP 10-2020-0085964 (published on Jul. 16, 2020, the title of the invention: ELECTRIC KICKBOARD)

DESCRIPTION OF DISCLOSURE

Technical Problems

Accordingly, one object of the present disclosure is to provide a charging system for personal mobility devices that may charge and standby with the end of use of the personal mobility device.

A further object of the present disclosure is to provide a charging system for personal mobility devices that may prevent safety accidents due to electric shock when charging personal mobility devices.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A charging system for personal mobility devices including the same to solve the above-noted objects of the present disclosure may is characterized in that charging and storage of the personal mobility devices are performed simultaneously.

More specifically, wireless charging may be performed in a state where a wheel of a personal mobility device is seated on a support portion so that the charging and storage of the personal mobility device may be preformed simultaneously and stably.

The charging system for the personal mobility devices according to the present disclosure is characterized in that wireless charging is performed between a first charging unit and a second charging unit so that the charging of the personal mobility device may be performed stably.

More specifically, a magnetic field for charging may be formed in the first charging unit provided in the fixing column, and the second charging unit may receive the magnetic field to charge the battery. Accordingly, the safety accidents due to electric shock may be prevented.

The charging system for the personal mobility devices according to the present disclosure may include at least one of a support unit, a fixing column, a first charging unit, a second charging unit, a charging measurement unit, a wireless controller, a display unit, a mounting sensor and a remote server.

The support unit may include a groove in which a wheel of the personal mobility is seated. The support unit may include a guide member and a guide groove. The guide member may form a groove recessed upward. One side of the guide member may be disposed toward the fixing column and the other side thereof may extend in a direction getting away from the fixing column. A guide groove may be formed in the guide member to guide movement of a wheel.

The fixing column may extend upward from one side of the support unit to face the personal mobility device. The fixing column may support the first charging unit. The support unit, the fixing column and the first charging unit may form one module, and a plurality of modules may be disposed.

The first charging unit may be disposed in a position from the fixing column toward the personal mobility device and configured to generate a magnetic field for wireless charging. The first charging unit may include a first housing, a transmission controller and a transmission coil.

The first housing may be fixed to the fixing column and have its movement to be restricted. A mounting space may be formed inside the first housing. The first housing may be formed of a plurality of members. The first housing may include a first housing body, a first core member and a first cover member. The first core member may be fixed to the first housing body with the transmission controller interposed therebetween. The first cover member may be fixed to the first core member with the transmission coil interposed therebetween.

The transmission controller may be disposed inside the first housing. The transmission coil may be disposed inside the first housing and connected with the transmission controller.

The second charging unit may be disposed in the personal mobility device and configured to charge a battery provided in the personal mobility device by converting the magnetic field transmitted from the first charging unit into power.

The second charging unit may include a second housing, a reception controller and a reception coil. The second housing may be fixed to the personal mobility device. The second housing may include at least one of a second housing body, a second core member and a second cover member.

The second housing body may be fixed to the personal mobility device. The second core member may be fixed to the second housing body with the reception controller interposed therebetween. The second cover member may be fixed to the second core member with the reception coil interposed therebetween.

The reception controller may be disposed inside the second housing, and may supply power to a battery provided in the personal mobility device. The reception coil may be disposed inside the second housing and connected with the reception controller.

A mounting sensor may be configured to measure whether the wheel is seated on the support unit.

A wireless controller may be connected with the mounting sensor, the first charging unit and a movement controller provided in the personal mobility device, the wireless controller configured to control an operation of the first charging unit. The wireless controller may receive a measured value of the charging measurement unit and wirelessly transmit the measured value.

A remote server may be configured to receive data from the wireless controller and determine whether the personal mobility device is mounted and whether it is being charged. In addition, the remote server may transmit a location and a charging state of the personal mobility device to a user terminal.

A charging measurement unit may be configured to measure whether the personal mobility device is being charged. The wireless controller may be connected to the wireless controller and the movement controller provided in the personal mobility device. The charging measurement device may measure whether a battery provided in the personal mobility device is being charged and transmit a measured value to the wireless controller.

A display unit may be disposed on the fixing column and configured to be luminescent with a preset color by being operated based on a control signal of the wireless controller and display a charging state of the personal mobility device.

Advantageous Effect

The charging system for the personal mobility device according to the present disclosure may include the support unit, the first charging unit and the second charging unit that are configured to wirelessly charge the battery of the personal mobility device. Accordingly, charging and storage of the personal mobility devices are performed simultaneously.

The plurality of support units for storing the personal mobility devices may be disposed in series. The storing and use standby of the personal mobility device may be performed at a preset place. Accordingly, pedestrians and vehicles may easily move.

In addition, the present disclosure may use the wireless charging to charge the battery of the personal mobility device, thereby preventing occurrence of safety accidents due to electric shock.

In addition, the remote server may collect whether the personal mobile device is seated on the support and whether it is charged or not, and transmits it to the user's terminal. Accordingly, the convenience of use of the personal mobile device can be improved.

Specific effects are described along with the above-described effects in the section of Detailed Description.

DETAILED DESCRIPTION OF EXEMPLARY EMBODIMENT

Figure 1:
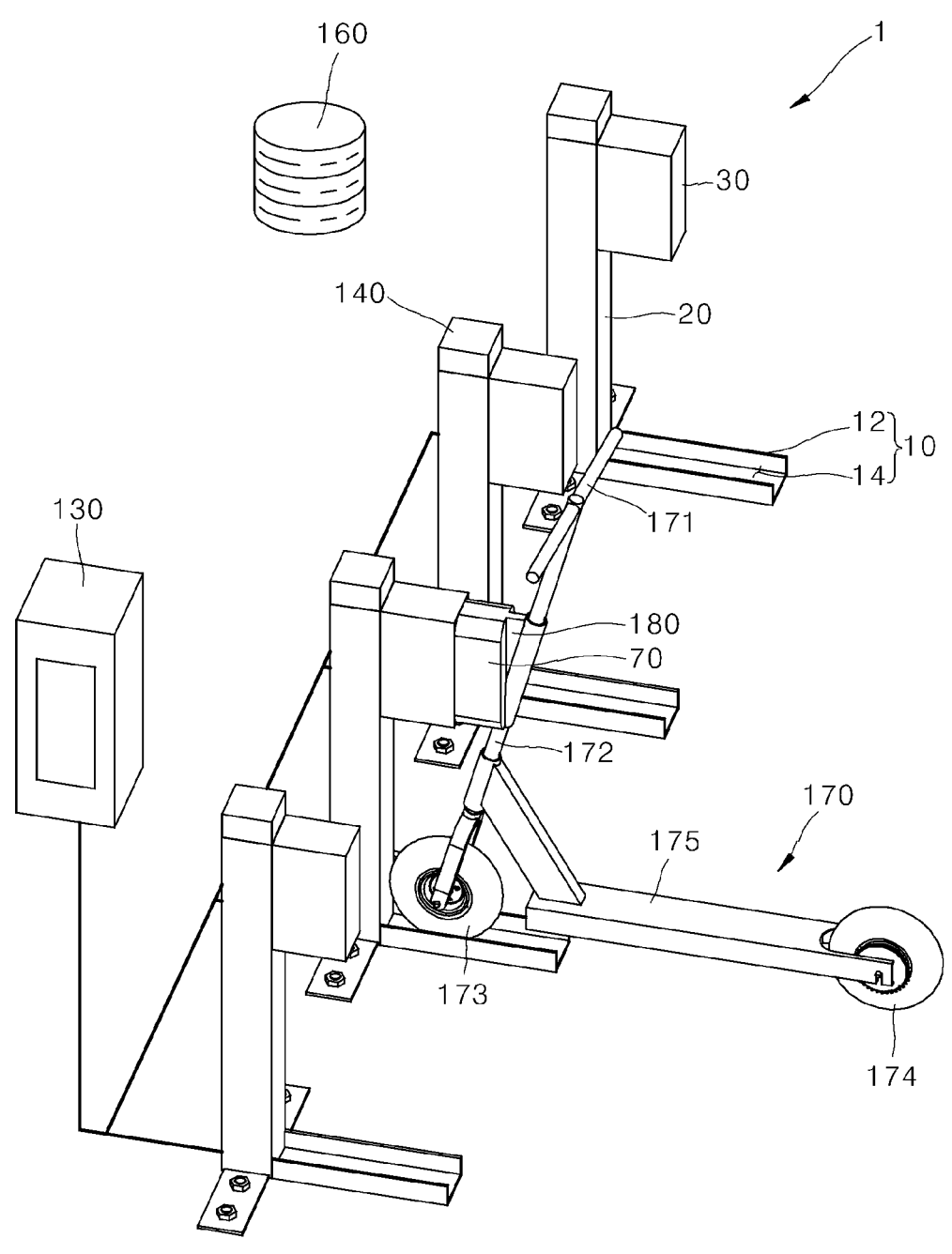
FIG. 1 is a perspective view showing a charging system for personal mobility devices according to an embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
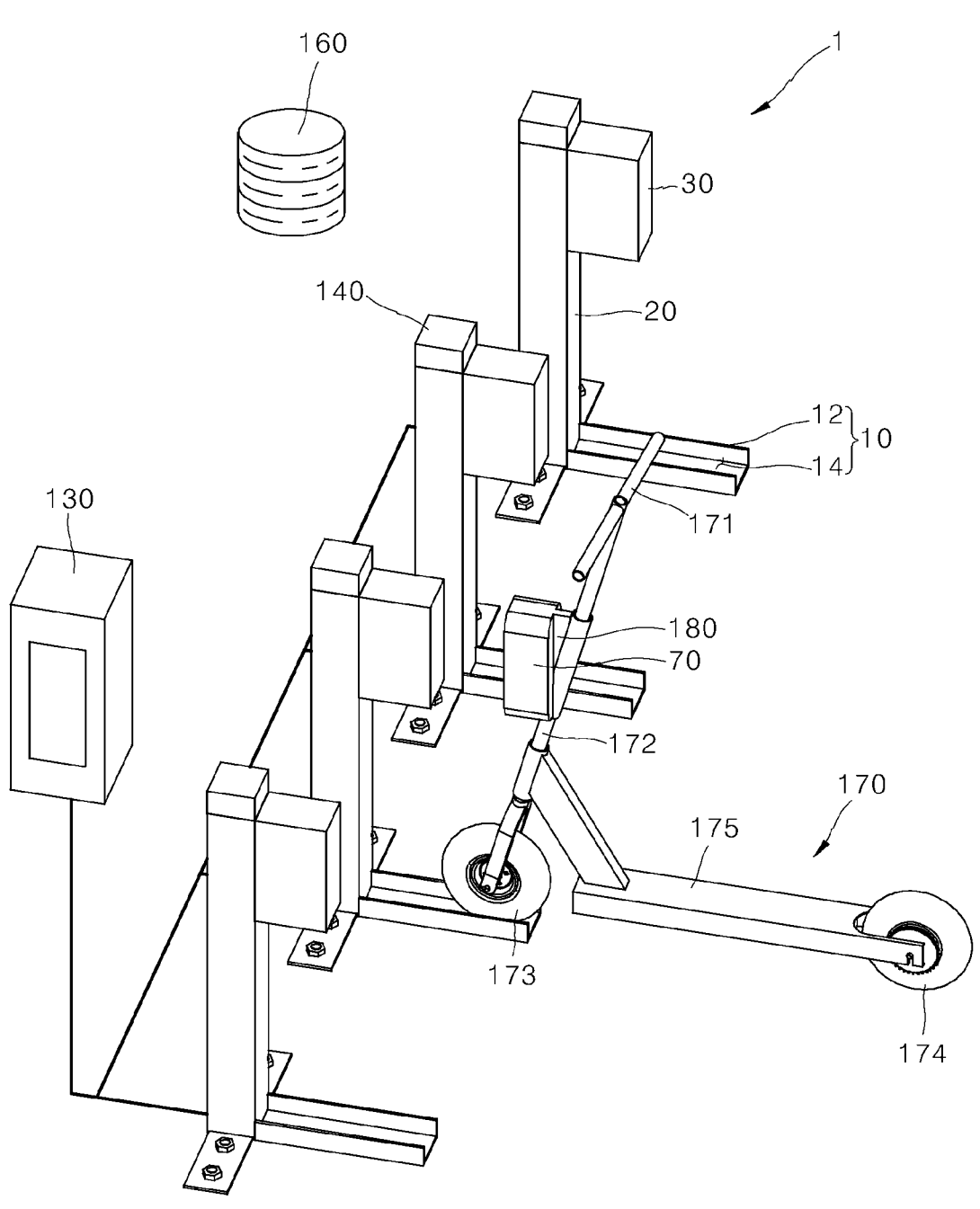
FIG. 2 is a perspective view showing a state where a second charging unit according to an embodiment of the present disclosure is spaced apart from a first charging unit.
Figure 6:
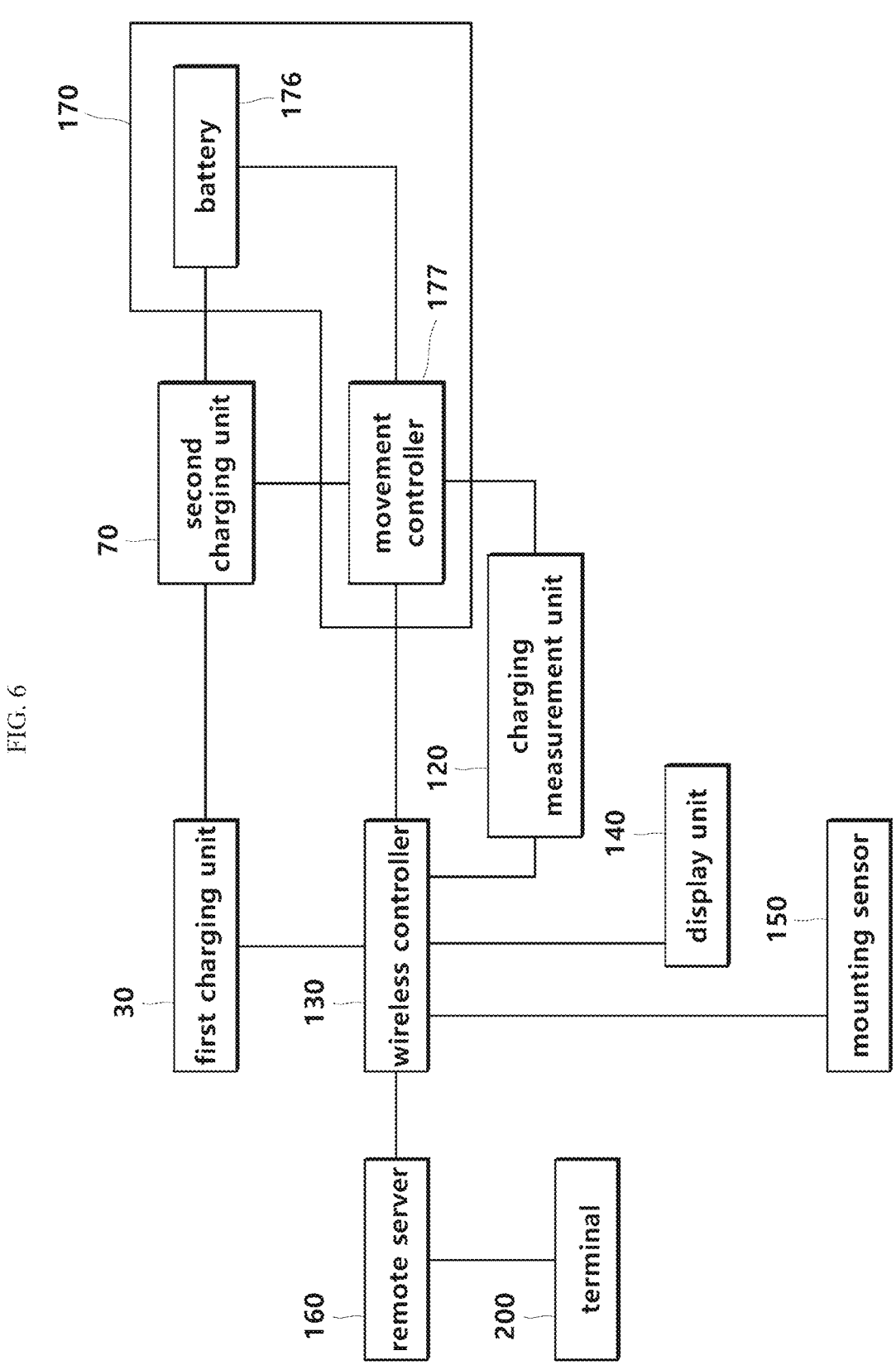
FIG. 6 is a block view of a charging system for personal mobility devices according to an embodiment of the present disclosure.

FIG. 1 is a perspective view showing a charging system 1 for personal mobility devices according to an embodiment. FIG. 2 is a perspective view showing a state where a second charging unit 70 according to an embodiment of the present disclosure is spaced apart from a first charging unit 30. FIG. 6 is a block view of a charging system 1 for personal mobility devices according to an embodiment of the present disclosure.

As shown in FIGS. 1, 2 and 6, the charging system 1 for the personal mobility devices according to an embodiment of the present disclosure may include at least one of a support unit 10, a fixing column 20, a first charging unit 30, a second charging unit 70, a charging measurement unit 120, a wireless control unit 130, a display unit 140 and a mounting sensor 150 and a remote server 160.

In the charging system 1 for the personal mobility devices according to an embodiment of the present disclosure, storage and wireless-charging of a personal mobility device 170 may be performed and a user may easily recognize a storage location and a charging state of the personal mobility device 170. The personal mobility device 170 may include a wireless charging module and the charging module may support the personal mobility device 170 in an upright state. In addition, since provided with a communication module platform through the wireless control unit 130 and the remote server 160, the user may easily check the location and the charging state of the personal mobility device 170 through a terminal 200.

The support unit 10 may be modified in various embodiments within a technical feature of including a groove in which a wheel of the personal mobility device 170 is seated. The support unit 10 according to an embodiment of the present disclosure may be a structure fixed to the floor to guide the wheel of the personal mobility device 170. Also, the support unit 10 may guide the personal mobility device 170 to be positioned in a front portion of the first charging unit 30 by guiding the movement of the wheel. The support unit 10 according to an embodiment of the present disclosure may include a guide member 12 and a guide groove 14.

The guide member 12 may have a cross section formed in a 'C' shape opened upward like an open square tube.

The guide groove 14 provided on an inner surface of the guide member 12 may be a groove that linearly extends along the guide member 12 to guide the movement of the wheel.

The fixing column 20 may be disposed in one side of the support unit 10 and extend upward so that it may face the personal mobility device 170 seated on the support unit 10. The fixing column 20 may support the first charging unit 30. The support unit 10, the fixing column 20 and the first charging unit 30 may form one module, and a plurality of such modules may be serially disposed.

Since the support unit 10 for guiding the movement of the personal mobility device 170 is connected to a lower portion of the fixing column 20, the support unit 10 may be fixed to the ground together with the fixing column 20. The plurality of support units 10 for storing the personal mobility devices 170 may be disposed in series so that storage and standby of the used personal mobility device 170 may be performed in a preset place. Accordingly, the personal mobility device 170 after used may be mounted on the support unit 10 instead of on a road or sidewalk so that movement of pedestrians and vehicles may be made more easily.

A charging module composed of the fixed column 20 and the support unit 10 may include a first charging unit 30 which is a Tx module for wireless charging, and may store the personal mobility device 170 in an upright state. A module composed of the fixing column 20 and the support unit 10 may be provided in plural. The arrangement of those modules may be made in a row or in a zigzag shape. Accordingly, as many personal mobility devices as possible may be stored within a preset space.

Figure 3:
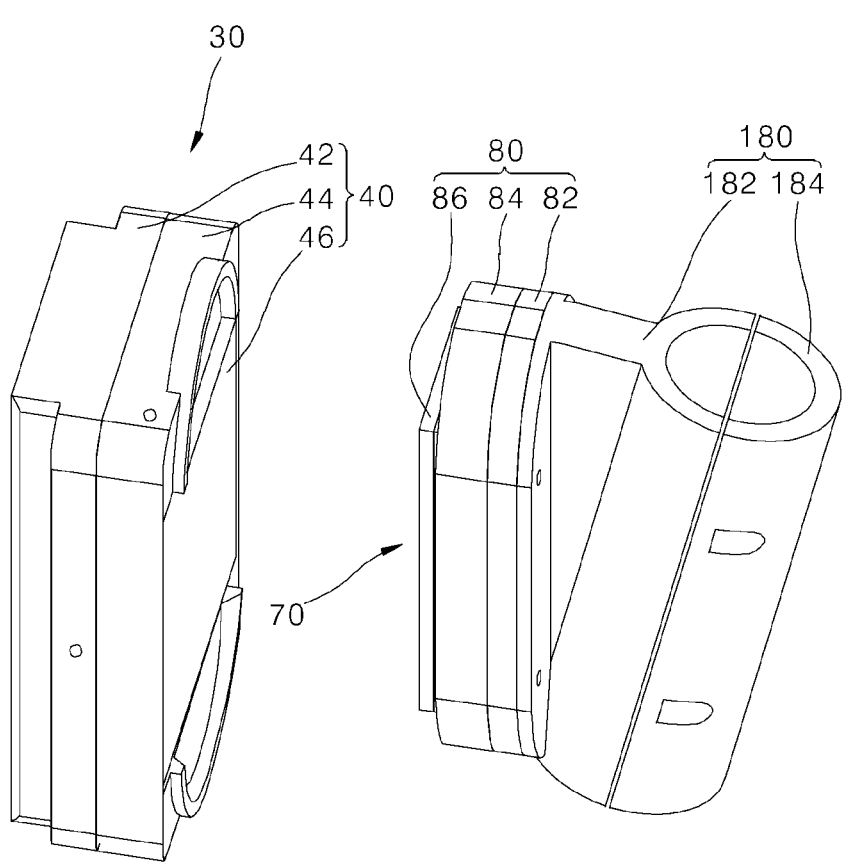
FIG. 3 is a perspective view showing a first charging unit and a second charging unit according to an embodiment of the present disclosure.
Figure 4:
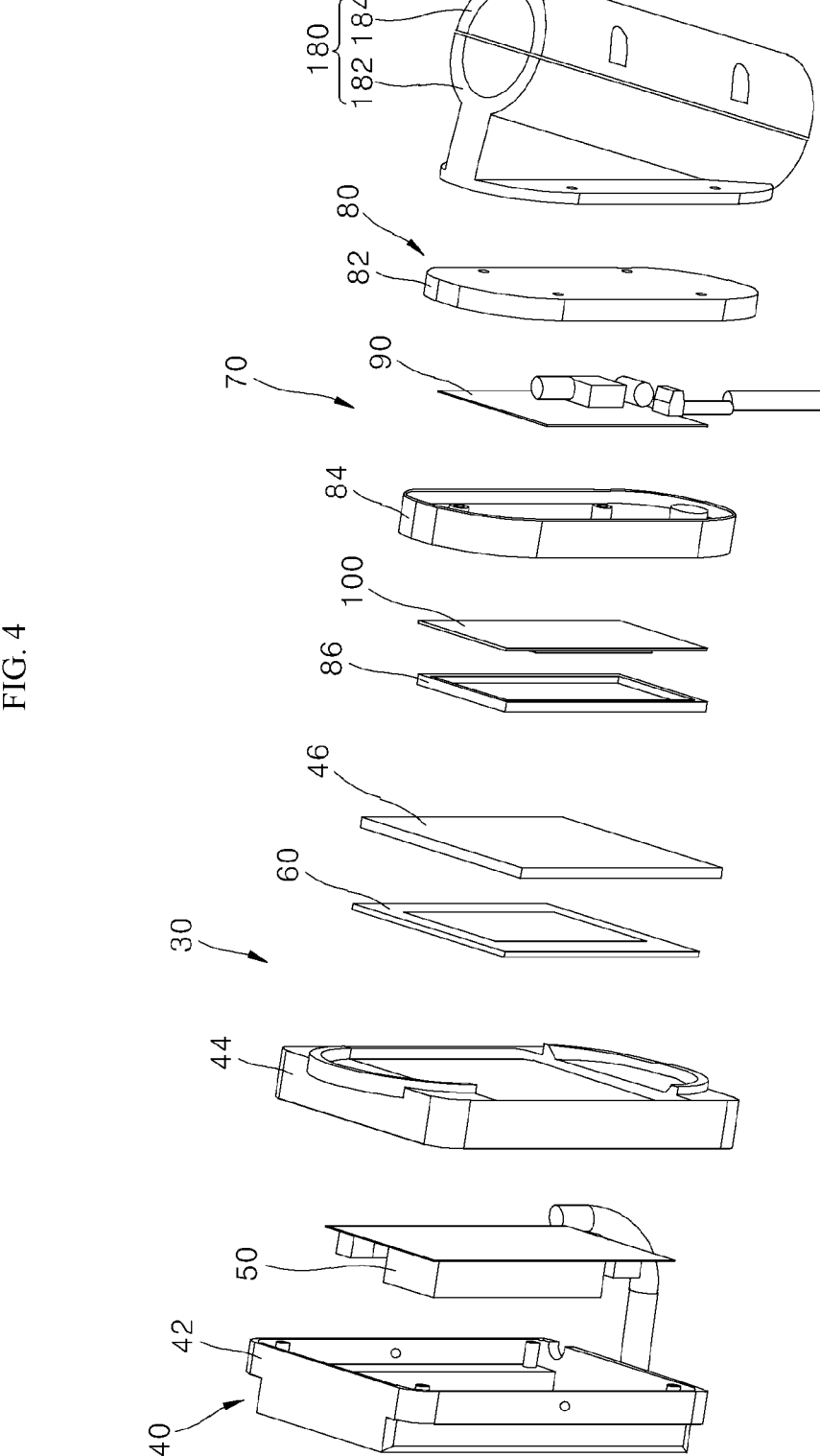
FIG. 4 is an exploded perspective view of a first charging unit and a second charging unit according to an embodiment of the present disclosure.
Figure 5:
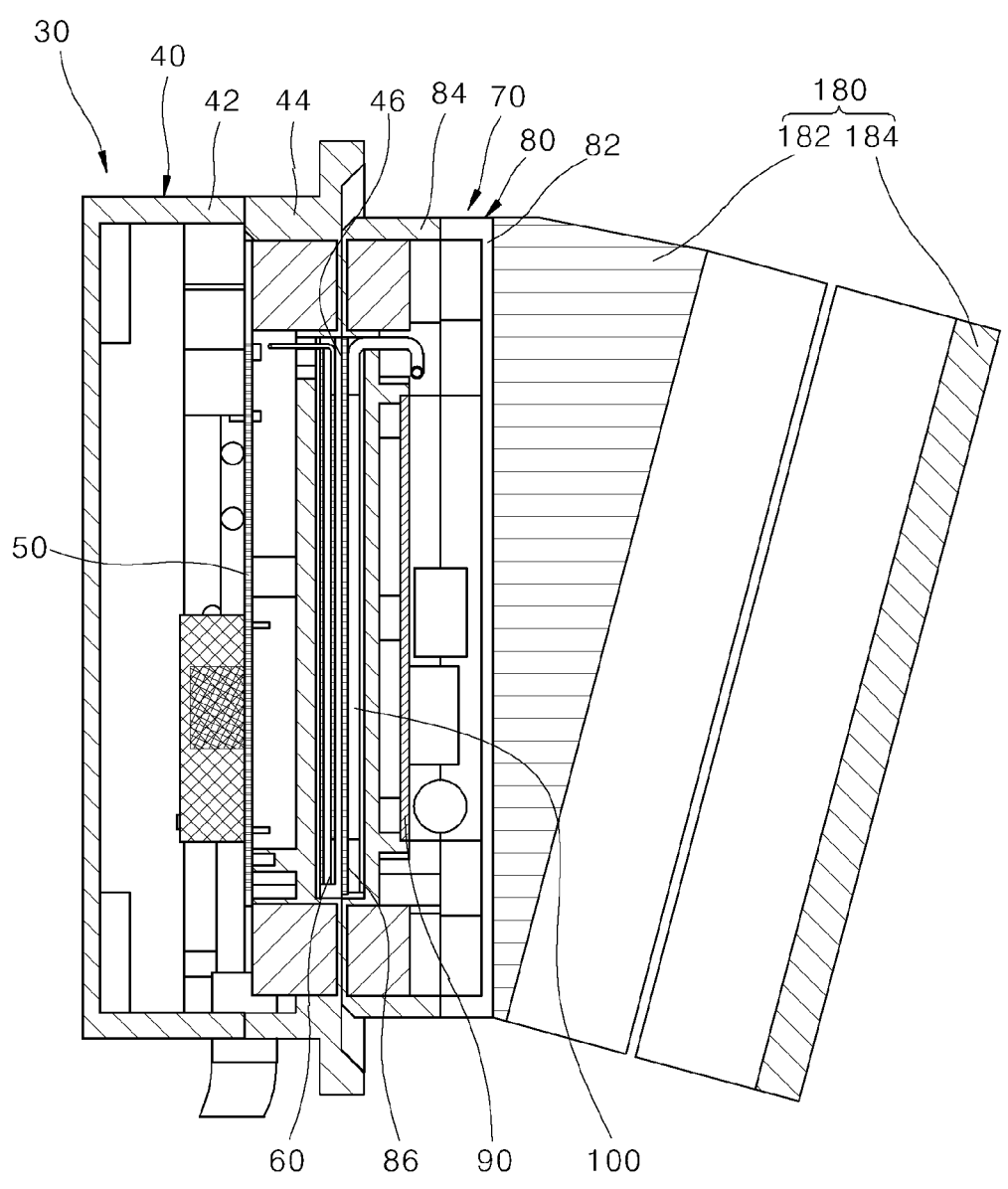
FIG. 5 is a sectional view of a first charging unit and a second charging unit according to an embodiment of the present disclosure.

FIG. 3 is a perspective view showing a first charging unit 30 and a second charging unit 70 according to an embodiment of the present disclosure. FIG. 4 is an exploded perspective view of a first charging unit 30 and a second charging unit 70 according to an embodiment of the present disclosure. FIG. 5 is a sectional view of a first charging unit 30 and a second charging unit 70 according to an embodiment of the present disclosure.

As shown in FIGS. 3 to 5, the first charging unit 30 may be provided in direction from the fixing column 20 to the personal mobility device 170, and may be configured to generate a magnetic field for wireless charging. The first charging unit 30 may include a first housing 40, a transmission controller 50 and a transmission coil 60. The first charging unit 30 may be operable by a control signal of the wireless control unit 130 and configured to generate a magnetic field toward the second charging unit 70 disposed in a front portion of the personal mobility device 170.

The magnetic field for wireless charging generated in the first charging unit 30 may be sent to the second charging unit 70 disposed in the personal mobility device 170 to charge the battery 176 of the personal mobility device 170, so that safety accidents due to electric shock may be prevented.

The first charging unit 30 may be fixedly coupled to the fixing column 20 or coupled to a bracket disposed at a position that can be changeable if necessary. When the first charging unit 30 is coupled to the bracket disposed at the variable position, the position of the first charging unit 30 may be changed to match the second charging unit 70 even if the position of the second charging unit 70 is changed. Accordingly, the battery 176 may be stably charged.

The first housing 40 may be secured to the fixing column 20 so that the movement of the first housing 40 may be restricted. A mounting space may be provided inside the first housing and the first housing 40 may be made of a non-metal and non-conductive material. The first housing 40 according to an embodiment may be made of a plurality of members. The first housing 40 may include a first housing body 42, a first core member 44 and a first cover member 46.

The first housing body 42 may be fixed to the fixing column 20 and have an opening toward a first measurement unit. Since being fixed to a lateral surface of the fixing column 20, the first housing body 42 may be protruded outward from the fixing column 20. The first housing body 42 may be formed of a material having high thermal conductivity including an aluminum alloy for heat radiation or an insulating material such as plastic.

The first core member 44 may be fixed to the first housing body 42 with the transmission controller 50 interposed therebetween. The first core member 44 may include an aluminum alloy for heat radiation, and may be made of a material having high thermal conductivity. A cable connected to the transmission controller 50 disposed between the first core member 44 and the first housing body 42 may extend outward from the first housing 40. Such the first core member 44 may be provided between the transmission controller 50 and the transmission coil 60, and may serve as a partition wall for blocking the magnetic field generated in the transmission coil 60 from being sent to the transmission controller 50.

The first cover member 46 may be fixed to the first core member 44 with the transmission coil 60 interposed therebetween. The first cover member 46 may be molded by injecting plastic, and may serve to cover the transmission coil 60 so that it may not be exposed to the outside.

The transmission controller 50 may be disposed inside the first housing 40. The transmission controller 50 may include a control element configured to form a magnetic field by supplying power to the transmission coil 60. The control element may be mounted on a printed circuit board to compose the transmission controller 50.

The transmission coil 60 may be provided inside the first housing 40 and connected with the transmission controller 50. The first core member 44 may be disposed between the transmission coil 60 and the transmission controller 50. A cable receiving power may connect the transmission coil 60 and the transmission controller 50 with each other.

The transmission coil 60 may be provided between the first core member 44 and the first cover member 46, and a coil may be spirally wound. The transmission coil 60 may be configured to generate a magnetic field for wireless charging in a direction in which the first cover member 46 is disposed. The transmission coil 60 may be secured to a plate-shaped member to maintain the winding.

The second charging unit 70 may include a receiver circuit configured to receive wireless power and secured to personal mobility devices 170 with various sizes, thereby reducing initial installation costs. The second charging unit 70 may be secured to a rotary column 172 of the personal mobility device 170 through a charging bracket 180. The second charging unit 70 may be used in common for various types of personal mobility devices 170 by replacing only the charging bracket 180 based on the model of the personal mobility device 170.

The second charging unit 70 may be mounted to the personal mobility device 170, and may be modified in various examples within a technical feature of charging the battery 176 provided in the personal mobility device 170 by converting the magnetic field transmitted from the first charging unit 30 into power. The second charging unit 70 according to an embodiment of the present disclosure may include a second housing 80 and a reception controller 90 and a reception coil 100.

The first charging unit 30 coupled to the fixing column 20 may be configured to form the magnetic field for wireless charging, and the second charging unit 70 mounted to the personal mobility device 170 may be configured to charge the battery 176 by using the magnetic field received from the first charging unit. Due to the structure, occurrence of safety accidents generated by electric shock may be prevented.

The second housing 80 may be secured to the personal mobility device 170. Alternatively, the second housing 80 may be secured to a charging bracket 180 so that the movement of the second housing 80 may be restricted. The charging bracket 180 to which the second housing 80 is mounted may be fixed to the rotary column 172. A mounting space may be provided inside the second housing 80 and the second housing 80 may be molded by injecting a non-metal and non-conductive material. The second housing 80 according to an embodiment may be made of a plurality of members, and may include a second housing body 82, a second core member 84 and a second cover member 86.

The second housing body 82 may be secured to the charging bracket 180 and have an opening that is open toward the first measurement unit.

The second core member 84 may be secured to the second housing body 82. The reception controller 90 may be disposed between the second core member 84 and the second housing body 82. The second core member 84 may be molded by injecting a material including an aluminum alloy for heat radiation and having high thermal conductivity, and may be configured to divide spaces for the reception controller 90 and the reception coil 100.

The reception controller 90 may be provided between the second core member 84 and the second housing body 82, a cable connected to the reception controller 90 may extend outward with respect to the second housing 80. The second core member 84 may have a partition wall shape disposed between the reception controller 90 and the reception coil 100, thereby preventing the reception controller 90 from being damaged by the magnetic field.

The second cover member 86 may be secured to the second core member 84 with the reception coil 100 interposed therebetween. The second cover member 86 may be molded by injecting plastic. The second cover member 86 may prevent the reception coil 100 from being exposed to the outside.

The present disclosure may be provided with the support unit 10 configured to support the personal mobility device 170, the first charging unit 30 configured to wirelessly charge the batter 176 of the personal mobility device 170, and the second charging. Accordingly, the personal mobility device 170 may be charged and placed together with the return, thereby improving convenience of use.

The reception controller 90 may be disposed inside the second housing 80 and configured to supply the power transmitted through the reception coil 100 to the battery 176 provided in the personal mobility device 170. In addition, the reception controller 90 may include a control element for switching the transmitted magnetic field into electric power. The reception controller 90 may be configured by mounting the control element on the printed circuit board.

The reception coil 100 may be disposed inside the second housing 80 and connected with the reception controller 90. Since the second core member 84 is disposed between the reception coil 100 and the reception controller 90, a cable for receiving power may connect the reception coil 60 and the reception controller 50 with each other by passing through the second core member 84.

The reception coil 100 may be provided between the second core member 84 and the second core member 86, and the coil may spirally be wound. The area of the reception coil 100 may be equal to or smaller than that of the transmission coil 60. Accordingly, even if the second charging unit 70 including the reception coil 100 does not match the first charging unit 30, the possibility may increase that the reception coil 100 is disposed inside the transmission coil 60 and wireless charging may be made more quickly and easily.

When the personal mobility device 170 is charged by using the conventional charging system, the personal mobility devices 170 are collected, moved to a warehouse to be charged. So there is a problem in that the cost required for device damage and charging might increase. However, charging may be performed together with the return of the personal mobility device 170 according to the present disclosure. So damage to the device may be prevented and the costs required for charging may be reduced.

The charging measurement unit 120 according to the present disclosure may be modified in various embodiments within a technical scope of measuring whether the personal mobility device 170 is charged. The charging measurement unit 120 according to an embodiment of the present disclosure may be installed in at least one of the fixing column 20, the first charging unit 30 and the second charging unit 70.

The charging measurement unit 120 may be connected to the wireless controller 130 and a movement controller 177 provided in the personal mobility device 170. The charging measurement unit 120 may be configured to measure whether the battery 176 provided in the personal mobility device 170 is being charged or fully charged through the movement controller 177, and then transmit a measurement value to the wireless controller 130.

The movement controller 177 provided in the personal mobility device 170 may receive whether or not the battery 176 is being charged. The charging measurement unit 120 may receive data from the movement controller 177. Then, the charging measurement unit 120 receive a data of the movement controller 177 and indirectly measure whether or not the battery 176 is being charged or fully charged. Alternatively, various modifications may be possible such as the charging measurement 120 may be directly connected to the battery 176 or the reception controller 90 to measure whether or not the battery 176 is being charged or fully charged.

The wireless controller 130 may be modified in various embodiments within a technical scope of being connected with the mounting sensor 150, the first charging unit 30 and the movement controller 177 provided in the personal mobility device 170, while being wirelessly connected with the remote server 160. The wireless controller 130 according to an embodiment of the present disclosure may be configured to control the operation of the first charging unit 30. In addition, the wireless controller 130 may receive a value measured by at least one of the charging measurement unit 120 and the mounting sensor 150, and may wirelessly transmit the received value to the remote server 160. The wireless controller 130 may be disposed inside the fixing column 20 or the first charging unit 30.

The wireless controller 130 may be wirelessly connected with movement controllers 177 provided in a plurality of personal mobility devices 170, respectively, which are mounted to the plurality of support units 10. Hence, the wireless controller 130 may the personal mobility devices 170 may receive a value measured by at least one of the mounting sensor 150 and the mounting sensor 150, and may transmit the received value to the remote server 160. The wireless controller 130 may be provided inside the fixing column 20 or the first charging unit 30.

The wireless controller 130 may be wirelessly connected with the movement controller 177 provided in each of the plurality of personal mobility devices 170 mounted on the plurality of support unit 10. Hence, the wireless controller may receive a value measured by the mounting sensor 150 detecting whether the personal mobility device 170 is mounted on the support unit 10, and may transmit the result of the detecting whether the personal mobility device 170 is mounted to the remote server 160. After that, the wireless controller 130 provided with the measured value of the charging measurement unit 120 may transmit a charging state of the battery 176 provided in the personal mobility device 170 to the remote server 160.

The display unit 140 may be disposed on the fixing column 20 and configured to be luminescent based on a control signal of the wireless controller 130 to display a charging state of the personal mobility device 170. A plurality of display units 140 corresponding to the plurality of fixing columns 20 may be provided so that the user may easily see the display units 140 from the outside of the fixing column 20. The display unit 140 according to an embodiment of the present disclosure may be disposed on a top of the fixing column 20 and configured to emit light of a set color to display whether the personal mobility device 170 is mounted and being charged. It may be indicated based on sound together with the light source whether the personal mobility device 170 is mounted and whether the personal mobility device 170 is being charged.

The mounting sensor 150 may be modified in various embodiments within a technical scope of detecting whether a wheel is seated on the support unit 10. The mounting sensor 150 according to an embodiment of the present disclosure may be installed in the support unit 10 and configured to detect contact of the wheel of the personal mobility device 170. Or, the mounting sensor 150 may detect the pressure applied thereto by the wheel of the personal mobility device 170. Or, the mounting sensor 150 may be installed in the support unit 10 or the fixing column 20 and detect the presence of the mounted personal mobility device 170 by irradiating light rays.

The remote server 160 may receive data from the wireless controller 130 and determine whether the personal mobility device 170 is mounted or being charged based on the received data. The remote server 160 and the wireless controller 130 may be connected with each other by wire or wirelessly. The remote server 160 according to an embodiment of the present disclosure may be connected with the wireless controller 130 wirelessly. The remote server 160 may be provided with the data related to the presence and the charging of the mounted personal mobility device 170.

The remote server 160 may transmit the location and charging state of the personal mobility to the user's terminal

200. Accordingly, the user may easily grasp the location and charging state of the personal mobility device 170 through the terminal 200. The remote server 160 may collect data indicating whether the personal mobility device 170 is standby in a state of being mounted on the support unit 10 and whether it is charged on the support unit, and may transmit the collected data to the user's terminal 200, thereby improving use convenience of the personal mobility device 170.

The terminal 200 may include a smart phone, and may be one of the various wireless terminal devices configured to transceive data with the remote server 160.

The personal mobility device 170 may include a handle 171, a rotary column 172 extended downward from the handle 171 to be rotatable together with the handle 171. The first charging unit 30 may be secured to the rotary column 172. Or, a charging bracket 180 may be secured to the rotary column 172 and the second charging unit 70 may be then secured to the charging bracket 180.

The charging bracket 180 may include a first bracket 182 and a second bracket 184 that are provided in both sides with the rotary column 172 interposed therebetween. The first bracket 182 and the second bracket 184 may be fastened by a bolt, while surrounding the rotary column 172. The first bracket 182 may support the second charging unit 70 and the coupling position of the second charging unit 70 may be variable based on the shape of the first bracket 182.

A front wheel 173 may be rotatably coupled to a lower portion of the handle 171 and a rear wheel 174 may be rotatably coupled to a footrest portion 175 connected with the rotary column 172. The wheels provided in the personal mobility device 170 may include the front wheel 173 and the rear wheel 174, and may further include a wheel if necessary.

At least one of the front wheel 173 and the rear wheel 174 may be provided with a power by a motor. The motor may be provided with power through the battery 176 installed in the footrest portion 175. The battery 176 may be modified in various embodiments such as being connected with the second charging unit 70 to be supplied power or connected with the movement controller 177 provided in the personal mobility device 170 to be supplied power.

The movement controller 177 may be connected with the second charging unit 70 and the battery 176, and configured to measure a charging degree of the battery 176 and transmit the measured value to the charging measurement unit 120 or the wireless controller 130.

The charging system 1 for the personal mobility device according to the present disclosure may be installed in a fixed position at a certain location so that the personal mobility device 170 may be easily used and returned. In addition, since the first charging unit 30 and the second charging unit 70 are charged by the wireless charging using the magnetic field, the risk of safety accidents due to electric leakage or electric shock may be prevented.

An electric kickboard is taken as the example of the personal mobility device 170, but is not limited thereto. Other types of mobility devices including an electric bicycle may be taken as the personal mobility device 170 according to the present disclosure.

Hereinafter, referring to the accompanying drawings, an operation state of the charging system 1 for the personal mobility device according to an embodiment of the present disclosure will be described in detail.

As shown in FIG. 2, the front wheel 173 of the personal mobility device 170 may be moved along the guide member 12 of the support unit 10. The front wheel 173 may be moved along the guide groove 14 so that the personal mobility device 170 may be moved to the fixing column 20 in which the first charging unit 30 is provided. As the guide member 12 supports both lateral surfaces of the front wheel 173, the personal mobility device 170 may be kept in an upright state.

As shown in FIG. 1, wireless charging may be performed in a state where the second charging unit 70 is in contact with the first charging unit 30 or spaced apart from the first charging unit 30 within a preset distance. The transmission coil 60 provided with power through the transmission controller 50 may generate a magnetic field for power generation. The magnetic field of the transmission coil 60 may be transmitted to the reception coil 100 to be converted into power by the reception controller 90. The converted power may be transmitted to the battery 176 to charge the battery 176.

Since the battery 176 of the personal mobility device 170 is wirelessly charged, the battery has versatility regardless of a shape of a wired charging port and thus may provide a charging docking station that is capable of responding to devices of all manufactures.

Meanwhile, when the first charging unit 30 is operating, the display unit 140 may be operated to display that the personal mobility device 170 is being charged.

The wireless charging of the personal mobility device 170 may be implemented at the same time when it is mounted on the support unit 10. Accordingly, the waiting time when the personal mobility device can be used again after returning it may be shortened so that similar device rental revenue may be earned with a smaller number of personal mobility devices 170, compared to the prior art.

In addition, the wireless controller 130 may identify the first charging unit 30 being charged among the plurality of first charging units 30, and may transmit data to the remote server 160.

Accordingly, the user may easily grasp how many personal mobility devices 170 are in a use standby state at which location through the terminal 200, thereby improving use convenience.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. A charging system for a personal mobility device that includes a wheel, a battery and a charger configured to convert a magnetic field into electricity for charging the battery, the charging system comprising:
    a support structure comprising a groove in which the wheel of the personal mobility device is seated;
    a fixing column extending upward from one side of the support structure and arranged to face the personal mobility device when the wheel of the personal mobility device is seated in the support structure;
    a magnetic field generator disposed at a position on the fixing column at a height equivalent to a height of the charger of the personal mobility device and configured to generate the magnetic field for wireless charging the personal mobility device; and a wireless controller configured to communicate with a movement controller provided in the personal mobility device,
    wherein the movement controller is configured to measure whether the personal mobility device is being charged and transmit the measured value to the wireless controller.

2. The charging system for the personal mobility device of claim 1, wherein the support structure comprises a guide member forming the groove recessed upward, and one side of the guide member is disposed toward the fixing column and the other side thereof extend in a direction getting away from the fixing column.

3. The charging system for the personal mobility device of claim 1, further comprising:
    a mounting sensor configured to measure whether the wheel is seated on the support structure.

4. The charging system for the personal mobility device of claim 3, further comprising:
    wherein the wireless controller is configured to communicate with the mounting sensor and the magnetic field generator, and the wireless controller is further configured to control an operation of the magnetic field generator.

5. The charging system for the personal mobility device of claim 4, wherein the wireless controller is configured to send data to a remote server that determines whether the personal mobility device is mounted and whether it is being charged.

6. The charging system for the personal mobility device of claim 1, wherein the magnetic field generator comprises,
    a first housing fixed to the fixing column;
    a transmission controller disposed inside the first housing; and
    a transmission coil disposed inside the first housing and connected with the transmission controller.

7. The charging system for the personal mobility device of claim 6, wherein the first housing comprises,
    a first housing body fixed to the fixing column;
    a first core member fixed to the first housing body with the transmission controller interposed therebetween; and
    a first cover member fixed to the first core member with the transmission coil interposed therebetween.

8. The charging system for the personal mobility device of claim 1, wherein the charger of the personal mobility device comprises,
    a second housing fixed to the personal mobility device;
    a reception controller disposed inside the second housing; and
    a reception coil disposed inside the second housing and connected with the reception controller.

9. The charging system for the personal mobility device of claim 8, wherein the second housing comprises,
    a second housing body fixed to the personal mobility device;
    a second core member fixed to the second housing body with the reception controller interposed therebetween; and
    a second cover member fixed to the second core member with the reception coil interposed therebetween.

10. A charging system for a personal mobility device that includes a wheel, a battery and a charger configured to convert a magnetic field into electricity for charging the battery, the charging system comprising:
    a magnetic field generator disposed at a height equivalent to a height of the charger of the personal mobility device and configured to generate a magnetic field for wireless charging the personal mobility device;

a charging measurement device configured to measure whether the personal mobility device is being charged; and a wireless controller configured to receive a measured value of the charging measurement device and wirelessly transmit the measured value to a remote server, the remote server configured to receive data from the wireless controller and to determine whether the personal mobility device is mounted and to determine whether the personal mobility device is being charged based on the data, wherein the wireless controller is configured to communicate with a movement controller provided in the personal mobility device, and wherein the movement controller is configured to measure whether the personal mobility device is being charged and transmit the measured value to the wireless controller.

11. The charging system for the personal mobility device of claim 10, further comprising:

a support structure comprising a groove in which the wheel of the personal mobility device is seated; and a fixing column extending upward from one side of the support structure and arranged to face the personal mobility device when the wheel of the personal mobility device is seated in the support structure.

12. The charging system for the personal mobility device of claim 10, wherein the support unit, the fixing column and the magnetic field generator form one module, and a plurality of modules are disposed.

13. The charging system for the personal mobility device of claim 11, further comprising:

a display unit disposed on the fixing column and configured to be luminescent with a preset color by being operated based on a control signal of the wireless controller and display a charging state of the personal mobility device.

14. The charging system for the personal mobility device of claim 11, wherein the remote server is provided with presence of the personal mobility device that is mounted and being charged, and transmits a location and a charging state of the personal mobility device to a user terminal.

15. A charging system for a personal mobility device that includes a wheel, a battery and a charger configured to convert a magnetic field into electricity for charging the battery, the charging system comprising:

a support structure comprising a groove in which the wheel of the personal mobility device is seated;

a magnetic field generator disposed at a height equivalent to a height of the charger of the personal mobility device and configured to generate the magnetic field for wireless charging; and a wireless controller configured to communicate with a movement controller provided in the personal mobility device, wherein the movement controller is configured to measure whether the personal mobility device is being charged and transmit the measured value to the wireless controller.

16. The charging system for the personal mobility device of claim 15, further comprising:

a mounting sensor configured to measure whether the wheel is seated on the support unit.

17. The charging system for the personal mobility device of claim 16, wherein the wireless controller is configured to receive a measured value of a charging measurement unit and wirelessly transmit the measured value to a remote server, and the remote server is further configured to receive data from the wireless controller and to determine whether the personal mobility device is mounted and to determine whether the personal mobility device is being charged based on the data.

18. The charging system for the personal mobility device of claim 17, wherein the charging measurement unit is connected with the wireless controller and the movement controller.

19. The charging system for the personal mobility device of claim 15, further comprising:

a fixing column extending upward from one side of the support structure and arranged to face the personal mobility device when the wheel of the personal mobility device is seated in the support structure, wherein the magnetic field generator comprises, a first housing fixed to the fixing column;

a transmission controller disposed inside the first housing; and a transmission coil disposed inside the first housing and connected with the transmission controller.

20. The charging system for the personal mobility device of claim 15, wherein the charger of the personal mobility device comprises, a second housing fixed to the personal mobility device;

a reception controller disposed inside the second housing and configured to supply power to a battery provided in the personal mobility device; and a reception coil disposed inside the second housing and connected with the reception controller.

* * * * *